UNITED STATES PATENT OFFICE.

OCTAVE DEVILLERS, OF JUMET, BELGIUM.

PROCESS FOR THE MANUFACTURE OF PLATES OR SLABS IMITATING MARBLE.

No. 817,963.     Specification of Letters Patent.     Patented April 17, 1906.

Application filed April 4, 1904. Serial No. 201,574.

*To all whom it may concern:*

Be it known that I, OCTAVE DEVILLERS, a subject of the King of the Belgians, and a resident of Jumet, Belgium, have invented a certain new and useful Process for the Manufacture of Plates or Slabs Imitating Marble, of which the following is a specification.

This invention has reference to a process for manufacturing multicolored sheets of glass having a rough surface for fixing them in place and which are made according to this process of covering with colored glass. This process is carried out in such a manner that glass bubbles of one or more colors are blown so as to form a ball, the thickness of which does not exceed one-half millimeter and which when bursting forms scales of various shades. These fragments of glass are sprinkled over a sheet of transparent glass, and it remains with the knowledge, taste, and craftiness of the workman to imitate in a perfect manner the lines, &c., of the design. Before this sheet is introduced into the oven it must be covered with an enamel of a suitable color (this enamel may also be poured over in a liquid state) which constitutes the backing color and fills up the empty spaces. In the oven the sheet of glass, scales, and enamel fuse together, so that the colors mix together and form a natural grain. As the scales are not completely fused, their edges and extremities constitute a rough surface for fixing the sheet in place, so that the plates can be easily attached by means of any convenient cement to surfaces of all kinds.

What I claim, and desire to secure by Letters Patent, is—

1. A process for manufacturing multicolored sheets of glass, having a rough surface for fixing purposes, which consists in covering the sheet of glass with multicolored glass scales and a layer of colored enamel, and then heating to a suitable temperature in order to partially fuse the scales and cause them to become attached by heat to the sheet of glass, substantially as described.

2. A process for manufacturing multicolored sheets of glass, having a rough surface for fixing purposes, consisting in heating a quantity of multicolored pieces of glass to a plastic state, in reducing the same to flakes or scales, in distributing said flakes or scales and a suitable enamel upon a sheet or pane of glass, and subsequently applying heat sufficient to fuse the flakes and sheet of glass.

3. A process for manufacturing multicolored sheets of glass, having a rough surface for fixing purposes, consisting in heating a quantity of multicolored pieces of glass to a plastic state, in reducing the same to flakes or scales, in distributing said flakes or scales upon a sheet or pane of glass, and subsequently applying heat sufficient to fuse the flakes and sheet of glass.

In testimony whereof I have set my hand in presence of two witnesses.

OCTAVE DEVILLERS.

Witnesses:
    R. WILLIAMS,
    GREGORY PHELAN.